(12) United States Patent  
Dunagan et al.

(10) Patent No.: US 8,380,841 B2  
(45) Date of Patent: Feb. 19, 2013

(54) STRATEGIES FOR INVESTIGATING AND MITIGATING VULNERABILITIES CAUSED BY THE ACQUISITION OF CREDENTIALS

(75) Inventors: John Dunagan, Bellevue, WA (US); Gregory D. Hartrell, Sammamish, WA (US); Daniel R. Simon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1374 days.

(21) Appl. No.: 11/608,126

(22) Filed: Dec. 7, 2006

(65) Prior Publication Data

US 2008/0141377 A1    Jun. 12, 2008

(51) Int. Cl.
*G06F 15/173*    (2006.01)
*G06F 11/00*    (2006.01)

(52) U.S. Cl. ............................. 709/224; 726/22; 714/38
(58) Field of Classification Search .................... 709/224
See application file for complete search history.

(56) References Cited

U.S. PATENT DOCUMENTS

| | | | |
|---|---|---|---|
| 6,438,600 B1 | 8/2002 | Greenfield et al. | |
| 6,510,523 B1 | 1/2003 | Perlman et al. | |
| 6,691,232 B1 | 2/2004 | Wood et al. | |
| 6,986,039 B1 | 1/2006 | Leah et al. | |
| 7,013,395 B1 * | 3/2006 | Swiler et al. | 726/25 |
| 7,085,925 B2 | 8/2006 | Hanna et al. | |
| 7,664,845 B2 * | 2/2010 | Kurtz et al. | 709/224 |
| 2002/0023059 A1 | 2/2002 | Bari et al. | |
| 2003/0005290 A1 * | 1/2003 | Fishman et al. | 713/156 |
| 2003/0065940 A1 | 4/2003 | Brezak et al. | |
| 2004/0193918 A1 | 9/2004 | Green et al. | |
| 2005/0171737 A1 * | 8/2005 | Hartley et al. | 702/186 |
| 2005/0172142 A1 | 8/2005 | Shelest et al. | |
| 2005/0246771 A1 | 11/2005 | Hunt et al. | |
| 2006/0021049 A1 * | 1/2006 | Cook | 726/25 |
| 2006/0053276 A1 | 3/2006 | Lortz et al. | |
| 2006/0080445 A1 | 4/2006 | Chang et al. | |
| 2006/0161816 A1 * | 7/2006 | Gula et al. | 714/39 |
| 2007/0083928 A1 * | 4/2007 | Mattsson et al. | 726/22 |
| 2008/0034425 A1 * | 2/2008 | Overcash et al. | 726/22 |

FOREIGN PATENT DOCUMENTS

| | | |
|---|---|---|
| EP | 1315065 | 5/2003 |
| JP | 2000148276 | 5/2000 |
| JP | 2004054706 | 2/2004 |
| JP | 2006526221 | 11/2006 |
| WO | WO0203178 A3 | 1/2002 |

OTHER PUBLICATIONS

Fovino, et al., "Emergent Disservices in Interdependent Systems and System-of-Systems", IEEE, 2006, pp. 590-595.

(Continued)

*Primary Examiner* — Mohamed Ibrahim
*Assistant Examiner* — Joiya Cloud
(74) *Attorney, Agent, or Firm* — Lee & Hayes, PLLC

(57) ABSTRACT

A strategy is described for assessing and mitigating vulnerabilities within a data processing environment. The strategy collects access data that reflects actual log-in behavior exhibited by users in the environment. The strategy also collects rights data that reflects the rights possessed by one or more administrators within the environment. Based on the access data and rights data, the strategy identifies how a user or other entity that gains access to one part of the environment can potentially compromise additional parts of the environment. The strategy can recommend and implement steps aimed at reducing any identified vulnerabilities.

20 Claims, 6 Drawing Sheets

OTHER PUBLICATIONS

Chiang, et al., "Risk and Vulnerability Assessment of Secure Autonomic Communication Networks" IEEE, 2007, pp. 1-6.

International Search Report for International application No. PCT/US2007/086694 mailed on May 14, 2008 (10 pages).

Bhatti, et al., "A Policy Framework for Access Management in Federated Information Sharing," available at least as early as Sep. 22, 2006, at <<http://web.ics.purdue.edu/~bhattir/academics/research/papers/IFIP_2005.pdf>>, Purdue University, 17 pages.

Pashalidis, et al., "Limits to Anonymity when Using Credentials," available at least as early as Sep. 22, 2006, at <<http://www.isg.rhul.ac.uk/~cjm/ltawuc2.pdf#search=%22domain%20%22credential%20sharing%22%22>>, University of London, 9 pages.

Smith, et al., "Joint Policy Management and Auditing in Virtual Organizations," available at <<http://ieeexplore.ieee.org/xpl/freeabs_all.jsp?arnumber=1261706>>, Proceedings of the Fourth International Workshop on Grid Computing (GRID'03), IEEE, 2003, 8 pages.

European Search Report mailed Sep. 5, 2011 for European patent application No. 07865339.1, 6 pages.

Russian Office Action mailed Dec. 8, 2011 for Russian patent application No. 2009121556, a counterpart foreign application of U.S. Appl. No. 11/608,126, 6 pages.

Australian Office Action mailed Jul. 7, 2011 for Australian patent application No. 2007329251, a counterpart foreign application of U.S. Appl. No. 11/608,126.

Japanese Office Action mailed May 18, 2012 for Japanese patent application No. 2009-540486, a counterpart foreign application of U.S. Appl. No. 11/608,126, 9 pages.

* cited by examiner

STRATEGIES FOR INVESTIGATING AND MITIGATING VULNERABILITIES CAUSED BY THE ACQUISITION OF CREDENTIALS

BACKGROUND

Organizations often devote extensive resources to improving the security of their data processing systems. In a common and well-studied code-based approach, an organization may attempt to identify a weakness in the code used in its data processing system. The organization can attempt to remedy this problem by designing a code patch which overcomes the perceived weakness.

However, as appreciated by the present inventors, the security of an organization depends on more than its code-based vulnerabilities. Once a malicious entity has gained access to the data processing system (through legitimate or illegitimate means), this entity can sometimes then exercise otherwise legitimate authority to gain control of additional parts of the data processing system and cause harm within the data processing system. The remedy to this type of problem is not necessarily through the redesign of code, as the misuse of legitimate authority may not reflect a deficiency in the code itself.

SUMMARY

A strategy is described for analyzing and mitigating vulnerabilities within an organization's data processing environment. The vulnerabilities ensue, in part, from the exploitation of legitimate access rights possessed by one or more administrators within the organization.

In one exemplary implementation, the strategy collects "access data" that reflects the actual log-in behavior exhibited by users in the data processing environment. The strategy also collects "rights data" that reflects the rights possessed by one or more administrators within the data processing environment. Based on the access data and rights data, the strategy identifies how a user or other entity that gains access to one part of the environment can potentially compromise additional parts of the environment.

The strategy can output the results of its analysis in various forms. For example, the strategy can output the results of its analysis as a graphical depiction of security dependencies within the data processing environment. Finally, the strategy can recommend and implement steps aimed at mitigating identified vulnerabilities.

Additional exemplary implementations and attendant benefits are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for identifying and mitigating rights-based vulnerabilities within a data processing environment. The strategy can be manifested in various systems, apparatuses, components, procedures, storage mediums, data structures, and other forms.

This disclosure includes the following sections. Section A describes an exemplary system for identifying and mitigating vulnerabilities within a data processing environment. Section B describes an exemplary procedure that explains the operation of the system of Section A.

A. Exemplary System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Introduction. Rights-Based Compromise of Security

Figure 1:
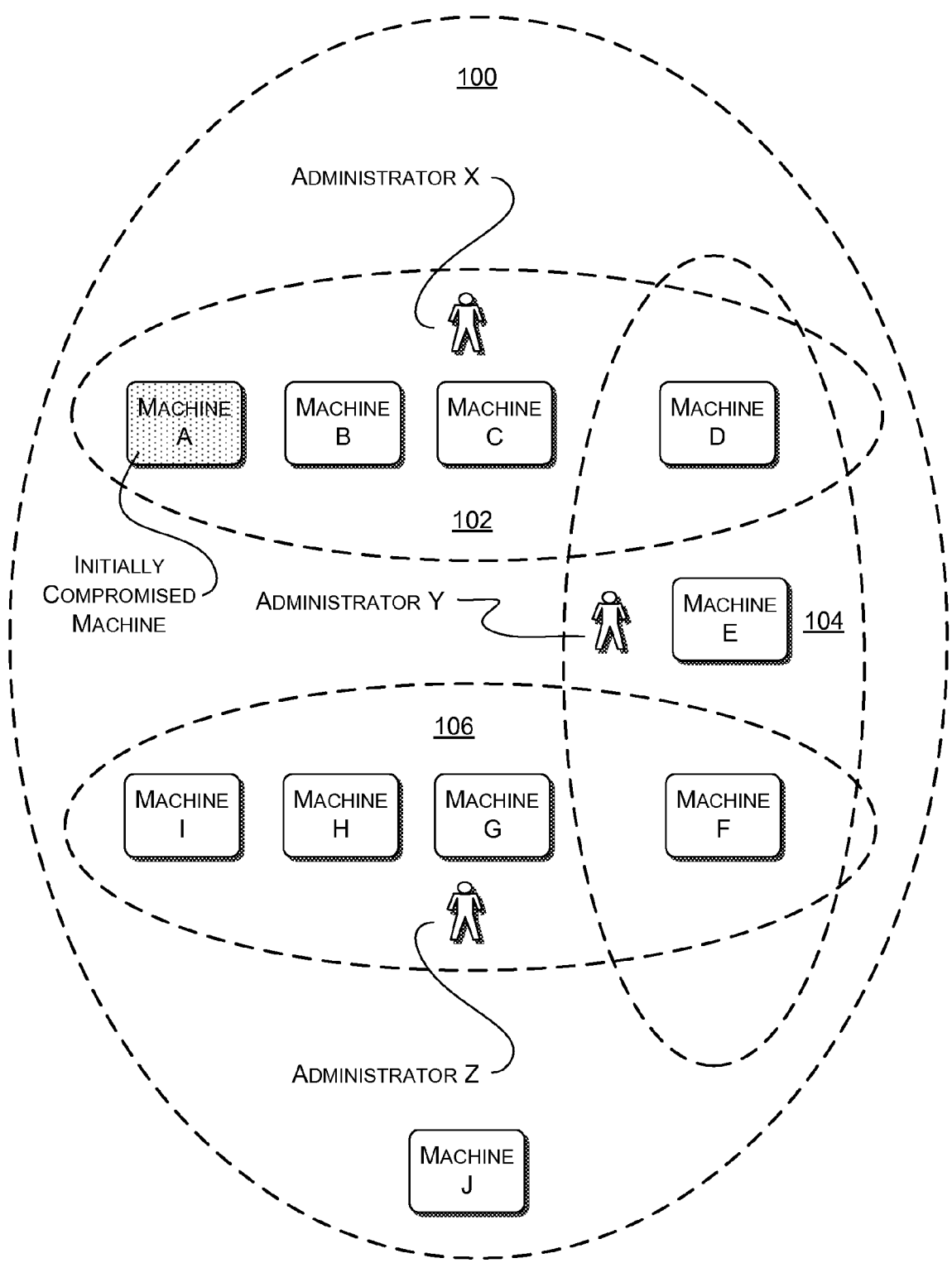
FIGS. 1 and 2 show an exemplary data processing environment, specifically illustrating an exemplary pathway through which an entity may gain control of parts of the data processing environment.
Figure 2:
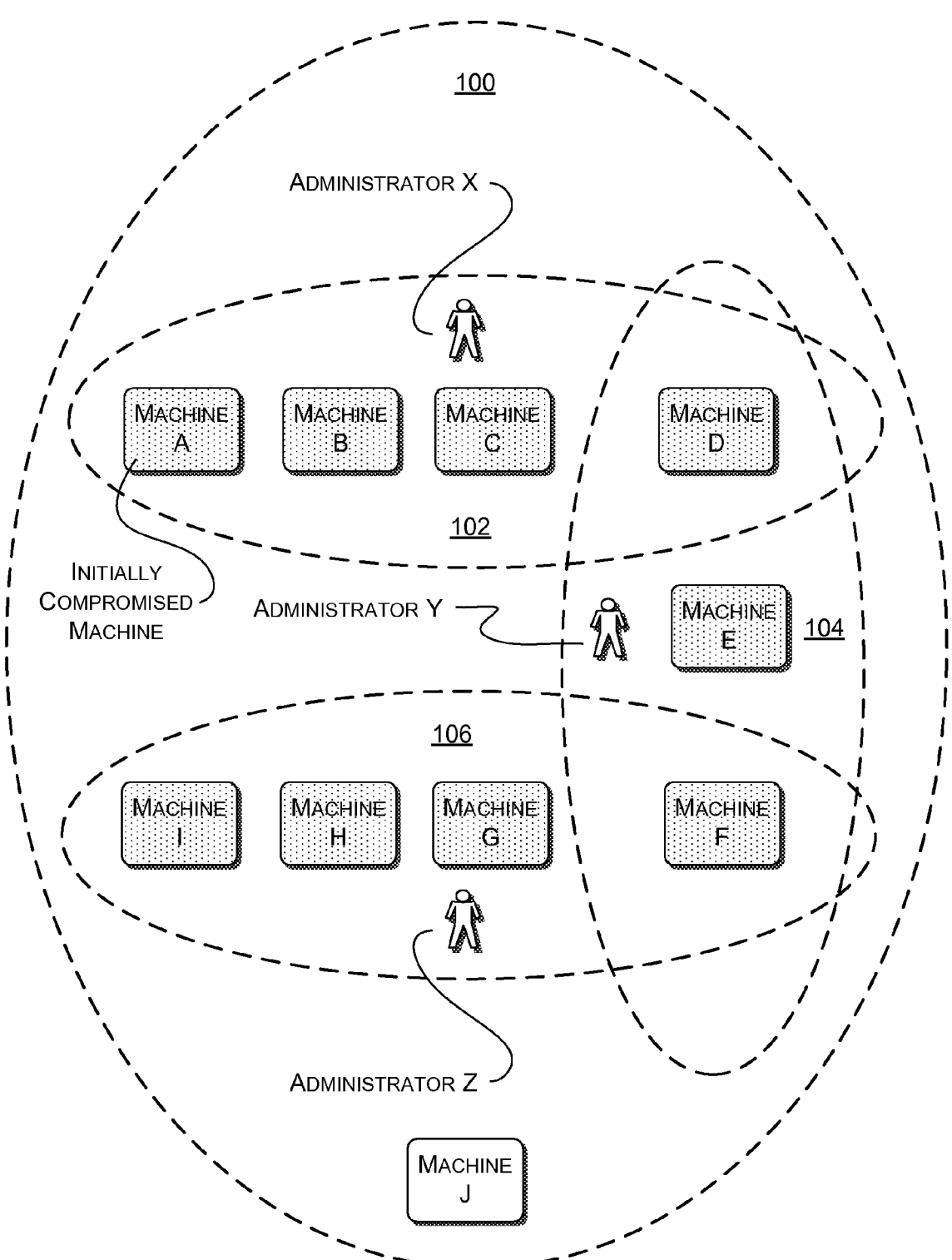

FIGS. 1 and 2 show an exemplary data processing environment 100 provided by an organization. Together, these two figures illustrate one exemplary way that the rights exercised by one or more administrators within the environment 100 can be "hijacked" or leveraged to exercise control within the environment 100, potentially causing damage within the environment 100. The next subsection describes a system for identifying and mitigating these vulnerabilities.

The data processing environment 100 can refer to any collection of components that serve any type of function. In one case, the components may refer, in part, to computer machines used within any kind of organization. For example, the components may refer to various types of user computers, server computers, and so forth. In the illustrative case of FIGS. 1 and 2, the data processing environment 100 includes representative components labeled A-J. (It will be appreciated that an actual environment may include many more components, e.g., potentially including hundreds of computer machines).

The organization associated with the components pertains to any type of entity or combination of entities. The organization may refer to one or more businesses, government entities, educational institutions, non-profit organizations, or other kinds of organizations or combinations thereof. The components within the data processing environment 100 may be coupled together via any type of network or combination of networks (not shown).

The data processing environment 100 can use any type of management functionality (not shown) to administer and coordinate the activities of components within the environment 100. For instance, the management functionality can include a centralized directory system to manage access rights possessed by agents acting within the data processing environment 100. By way of illustration and not limitation, the directory system can be implemented, at least in part, using Active Directory provided by Microsoft Corporation of Redmond, Wash. This directory system can manage system resources in a well known manner using various domains, user accounts, group accounts, and so forth.

The data processing environment 100 can control access to its resources using any type of authentication protocol or combination of authentication protocols. By way of illustration and not limitation, the data processing environment 100 can use the well-known Kerberos protocol to manage access to its resources. In the Kerberos protocol, a user can engage in an interactive sign-on session to prove his or her identity to a centralized authority, upon which the user is granted a Ticket-Granting-Ticket (TGT). The TGT can then be indirectly used to interact with various other components within the data processing environment 100.

The management functionality used by the data processing environment 100 may grant one or more administrators the right to access respective collections of components and perform various actions that may affect the components. For example, the management functionality may grant an administrator the right to access a collection of computer machines to modify existing code installed on these machines, to access existing information stored on these machines, to install new code on these machines, to remove existing code on these machines, and so on.

The term "administrator" is to be broadly construed as used herein. In one case, the management functionality can formally grant an administrator prescribed privileges to access a collection of computer machines. For instance, the management functionality may maintain one or more databases which identify the rights of one or more administrators. In other cases, a person may informally receive rights to control one or more aspects of the data processing environment 100, which may affect one or more users' computer machines. Such a person may be regarded as a de facto administrator.

Generally stated, the bundle of privileges granted to an administrator is referred to as "access rights" herein. An overall scope of control that is conferred to an administrator is referred to as that administrator's "sphere of influence." For example, as illustrated in FIG. 1, the management functionality allows an administrator X to access and perform actions on computer machines A, B, C, and D, constituting a sphere of influence 102. The management functionality allows an administrator Y to access and perform actions on a computer machines D, E, and F, constituting a sphere of influence 104. Finally, the management functionality allows an administrator Z to access and perform actions on computer machines F, G, H, and I, constituting a sphere of influence 106. An actual data processing environment may include additional or fewer administrators compared to the scenario shown in FIG. 1. For example, a data processing environment may include only a single administrator. Further, a sphere of influence in an actual data processing environment can include many more components compared to the scenario shown in FIG. 1 (e.g., potentially including hundreds, thousands, etc. of additional components). Finally, although not shown, an actual data processing environment may allow plural administrators to control a same sphere of influence. For example, both an administrator X and an administrator W (not shown) can control computer machines A, B, C, and D.

As a general characteristic, note that the spheres of influence associated with different administrators may overlap. For example, both administrator X and administrator Y have access to machine D. Also, both administrator Y and administrator Z have access to machine F. In the illustrative case of FIG. 1, note that none of the administrators has access to machine J. Further, in another case (not shown), an administrator may have a sphere of influence that does not overlap with the spheres of influence of other administrators.

An administrator's "credentials" generally refer to any information that enables the administrator to exercise his or her administrative privileges within a sphere of influence. In the non-limiting case of Kerberos, credentials relate to TGT information that is granted to an entity upon interactively logging into a machine. In general, an administrator's credentials typically reside on a machine at least while the administrator is interactively logged into the machine. This enables the machine to exercise the administrator's privileges on the administrator's behalf, at the administrator's command.

An administrator's privileges on a machine can include the ability to obtain any credentials residing on that machine, including those of other users or administrators. Once obtained, these credentials can be used in the same manner as any rightful possessor of such credentials. The credentials remain valid for different lengths of time, depending on credential type. Some credentials are valid for prescribed amounts of times, such as a month or more. Other credential types are valid only during the period when a user or administrator is actually logged in, and therefore may expire after a few hours. However, an administrator's privileges normally include the ability to confer administrative privileges to other users, or even to create new user accounts with administrative privileges on machines in their sphere of influence. Hence, it is possible to convert the short-term credentials into longer-term credentials through various legitimate mechanisms.

With the above introductory comments regarding the exemplary composition of the data processing environment 100, now assume that one of the machines—e.g., computer machine A—is compromised. The machine is compromised in the sense that an unauthorized person or other kind of entity (e.g., an automated BOT) gains access to the credentials used by a user of machine A to gain access to the data processing environment 100. For the purpose of this explanation, it is not material how this breach may occur. In other words, the security strategy addresses ways to ameliorate the harmful effects caused by unauthorized access to credentials, but does not necessarily preclude the initial unauthorized access to such credentials. The initial breach may or may not be due to a "hacking" type of attack, where a malicious entity gains access to an initial machine based on one or more code vulnerabilities in the data processing system.

Upon gaining access to computer machine A, the unauthorized entity can then potentially gain access to the credentials of administrator X through the mechanisms described above. For example, assume that the administrator X interactively logs into machine A to perform some administrative task on machine A (such as by adding a software patch to machine A). As described above, this operation results in administrator X's credentials being stored on machine A. This, in turn, exposes the credentials of administrator X to the unauthorized entity, allowing the unauthorized entity to acquire the credentials. After "stealing" the credentials of administrator X, the unauthorized entity can exercise the normal privileges of administrator X, and, in this sense, impersonate administrator X. The privileges include the ability to access any of the machines (A, B, C, and D) within the administrator X's sphere of influence 102. Moreover, administrator X's privileges within its sphere of influence 102 normally suffice to obtain any credentials residing on any machine within that sphere of influence 102 (through the mechanisms described above).

Note again that the sphere of influence 102 of administrator X overlaps with the sphere of influence 104 of administrator Y, and the sphere of influence 104 of administrator Y overlaps with the sphere of influence of administrator Z 106. Accordingly, the unauthorized entity can next potentially gain access to the computer machines in administrator Y's sphere of influence 104 via computer machine D, and can then potentially gain access to the computer machines in administrator Z's sphere of influence 106 via machine F (that is, providing that these administrators log into machines D and F, respectively, upon which their acquirable credentials will appear on these machines).

This successive process of credential-stealing can be repeated any number of times, enabling the unauthorized entity to gain access to a potentially large number of computer machines in the data processing environment 100. For example, advancing to FIG. 2, this figure indicates that the unauthorized entity has gained access to computer machines A-I through a series of credential acquisitions. The unauthorized entity may potentially be unable to gain access to one or more other computer machines (such as computer machine J) insofar as these machines are isolated from the nexus of control relationships that includes the initially-compromised machine A as a member thereof.

Upon gaining unauthorized access to one or more computer machines in the data processing environment 100, the unauthorized entity can perform various activities that can potentially harm the environment 100. For example, the data processing environment 100 can install malicious code into the environment 100, access private information, and so on.

Note that the process of credential stealing uses normal control channels in the data processing environment 100. The unauthorized entity gains access by stealing the legitimate rights possessed by administrative users, thereby impersonating the administrative users. However, there is nothing necessarily per se wrong with the management functionality used to grant administrative privileges in the data processing environment 100, as these privileges otherwise serve useful roles within the data processing environment 100. Instead, it is the interplay of different administrative privileges in the environment 100 that poses a problem. Stated in other words, it is the administrative control structure of the environment 100 as a whole which produces the vulnerabilities. For this reason, traditional code-based approaches to thwarting malicious attack are not generally, considered alone, effective solutions to this kind of problem, as the code is not the source of the problem, or at least not the only source of the problem.

A.2. Exemplary Vulnerability Analysis System

Figure 3:
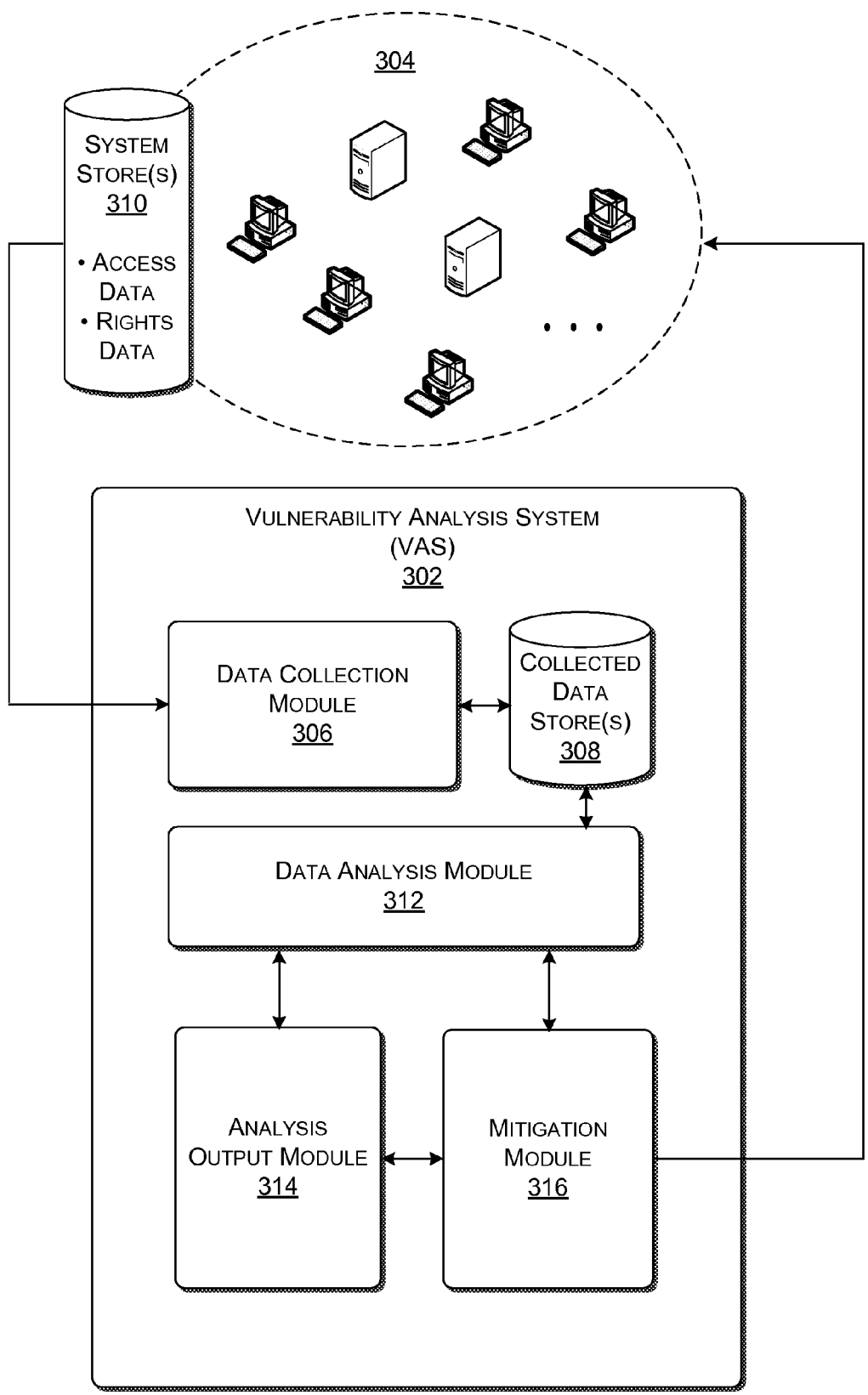
FIG. 3 shows an exemplary vulnerability analysis system (VAS) for identifying and mitigating vulnerabilities within a data processing environment.

FIG. 3 shows one exemplary implementation of a vulnerability analysis system (VAS) 302. By way of overview, the purpose of the VAS 302 is to examine the above-described types of credential-stealing vulnerabilities within a data processing environment 304. The VAS 302 displays the output of its analysis in various formats, such as a graphical depiction of security dependencies within the data processing environment 304. The VAS 302 may also include functionality devoted to mitigating assessed vulnerabilities, such as by recommending actions that may be taken to reduce the assessed vulnerabilities and/or actually implementing these actions.

The VAS 302 may represent code or logic circuitry (or some combination thereof) that can be implemented on one or more computer machines. For example, a security analyst or other suitably-authorized user can operate the VAS 302 on a special workstation, a general purpose computer, or other type of computing device. The VAS 302 can be communicatively coupled to the data processing environment 304 through any kind of network or combination of networks. This communicative coupling allows the VAS 302 to receive data from the data processing environment 304 and to optionally implement changes within the data processing environment 304. Alternatively, or in addition, an analyst can manually make changes within the data processing environment 304 based on analysis and recommendations generated by the VAS 302.

With the above introduction, each of the exemplary components of the VAS 302 will be explained below in turn.

The VAS 302 can include a data collection module 306 for collecting security-related data from the data processing environment 304. The data collection module 306 can store the security-data in one or more data stores 308. In one implementation, the components (e.g., computer machines) within the data processing environment 304 can be configured to proactively forward the security-related data to the data collection module 306, e.g., on a periodic basis or in response to some other triggering event. In another implementation, the data collection module 306 can be configured to poll the components in the data processing environment 304 to collect the security-related data. Stated in other words, the data collection module 306 can use a push or pull model to collect the security-related data.

The so-called security-related data pertains to any information that may have a bearing on the vulnerabilities exhibited by the data processing environment 304, and which can thus be used to analyze and diagnose such vulnerabilities. One general class of such security-related data is referred to as "access data." As the name suggests, this data reflects the access-related behavior of users and other entities within the data processing environment 304. More specifically, this data indicates log-in events that have occurred within the data processing environment 304. In one exemplary implementation, the access data may include Ticket-Granting-Ticket (TGT) information. The TGT information identifies credentials that are produced when users interactively log into the data processing environment 304. For example, in the context of the scenario shown in FIGS. 1 and 2, an illustrative piece of access data reflects the event of the administrator X logging onto machine A.

Another general class of security-related data is referred to as "rights data." Rights data reflects access rights held by administrators within the data processing environment 304. More specifically, the rights data may identify users who have been granted administrative rights. The rights data can also identify the respective groups of machines that the administrators may access and control by virtue of their administrative privileges. For example, in the context of the scenario of FIGS. 1 and 2, an illustrative piece of rights data conveys that the administrator X possesses certain access privileges to perform actions on computer machines A-D.

As a general feature, note that the access data reflects historical log-in behavior of users or other entities within the data processing environment 304. This data is dynamic in the sense that it is dependent on the occurrence of contingent events within the data processing environment 304 (namely, users signing into the data processing environment 304). In contrast, the rights data reflects the non-contingent structuring of administrative privileges within the network. However, while non-contingent, the rights data is also dynamic in the sense that the administrative structure of the data processing environment 304 can change at any time for any reason, e.g., to reflect the addition of new administrators, the removal of existing administrators, changes in the spheres of influence of administrators, and so on.

Different types of data processing environments include different management functionality and accounting infrastructure. Hence, the VAS 302 may use different techniques to collect access data and rights data depending on the particular data processing environment being analyzed and acted upon. FIG. 3 generally shows that the data processing environment 304 includes any collection of data stores 310 or other sources for providing the access data and the rights data. The data stores 310 can represent local stores maintained by individual computer machines within the data processing environment 304, or centrally-maintained stores that collect data from multiple different computer machines, or some combination of locally-maintained stores and centrally-maintained stores.

In one illustrative and non-limiting technical environment, the data collection module 306 can collect security-related data from four different sources.

A first source of security-related data is a centrally-maintained Audit Collection Services (ACS) database or like database. This database provides information regarding log-in events occurring within the data processing environment 304 based on the production of TGTs. (Recall that, in Kerberos technology, TGTs are associated with interactive log-in activity that occurs within the data processing environment 304).

A second source of security-related data is an Address Resolution Protocol (ARP) table or like table. The data in the ARP table maps Internet Protocol (IP) addresses to Media Access Control (MAC) addresses.

A third source of security-related data is a machine administrator database. This database identifies the names of various administrative groups and accounts that can control machines within the data processing environment 304, in one case, identifying these machines using MAC addresses.

A fourth source of security-related data is Active Directory or like directory mechanism, which provides information regarding the accounts that are associated with various groups in the data processing environment.

Information from the first and second data sources constitutes access data. Namely, the ACS database provides an indication of log-in events occurring in the data processing environment 304. The ARP table can be used to map IP address information (provided in the ACS database) to MAC address information. MAC address information is preferable to IP address information because it more definitely identifies the machines that are involved in log-in activity.

Information from the third and fourth data sources constitutes rights data. Namely, the machine administrator database and Activity Directory, taken together, provide an indication of various administrative accounts and groups in the data processing environment 304 and the accounts associated with individual groups.

A data analysis module 312 next comes into play by analyzing the security-related data stored in the data store 308. In general terms, the purpose of the data analysis module 312 is to reveal rights-related vulnerabilities within the data processing environment 304 by virtue of: (a) the credential information which currently appears in the data processing environment 304 (in a prescribed period of time, such as the last month) (that is, as reflected by the access data); and (b) the interplay of administrative rights conferred by the data processing environment 304 (that is, as reflected by the rights data). For example, in the scenario of FIGS. 1 and 2, the purpose of the data analysis module 312 is to determine that the compromise of any single computer machine A-I can potentially lead to the compromise of any other computer machine in this set of computer machines. The data analysis module 312 can employ various tools to trace the paths of possible rights-related compromise within the data processing environment 304. In one illustrative and non-limiting case, the data analysis module 312 can use a graph search tool to perform this task, such as a breadth-first search tool.

The data analysis module 312 can focuses its analysis in different ways depending on input selections made by the user. Representative types of analyses that can be selected are identified below:

In a first case, the user may instruct the data analysis module 312 to provide an overall indication of the security status within the data processing environment 304. In response, the data analysis module 312 can identity all of the control nexuses within the data processing environment 304. In one case, the data analysis module 312 can provide a worst-case analysis of the ultimate consequence of the compromise of one machine or the "theft" of certain account credentials within the environment 304. In another case, the data analysis module 312 can provide a dynamic analysis which demonstrates how credentials may be successively compromised within the data processing environment 304 over a period of time.

In a second case, the user can instruct the data analysis module 312 to identify the parts of the data processing environment 304 that have the greatest threat to the data processing environment 304. For example, the user can ask the data analysis module 312 to identify the computer machines or accounts that have the greatest potential for widespread credential stealing if compromised.

In a third case, the user can instruct the data analysis module 312 to provide specific analysis for one or more computer machines or accounts within the data processing environment that are of interest to the user. For example, these computer machines may represent machine within the user's workgroup, and the user may be entrusted with ensuring the integrity of services provided by these machines. The user can specifically ask the data analysis module 312 to identify how the machines of interest are affected by other machines in the environment, or how the machines of interest impact other machines in the environment. The user can identify the machines by specifying MAC addresses or other suitable identifying information.

In a fourth case, the user can ask the data analysis module 312 to identify the security-related consequences of one or more computer machines or accounts being compromised.

In a fifth case, the user can ask the data analysis module 312 to identify the security-related consequences of removing or adding accounts and/or programs to the data processing environment 304.

In a sixth case, the user can specify various design constraints, and then ask the data analysis module 312 to identify whether these constraints are satisfied, or, if not, how these constraints can be satisfied. For example, the user can specify that he or she wants a maximum of n entities being able to control a system of interest at any one time. The data analysis module 312 can identify whether this condition is met, and if not, how it can be met. In another case, the user can specify that he or she wants system M and system N to be entirely isolated. The data analysis module 312 can identify whether this condition is met, and if not, how it can be met.

The data analysis module 312 can perform yet other kinds of special analyses upon instruction from the controlling user. The above examples are representative rather than exhaustive of the possible types of analysis that can be performed.

An analysis output module 314 provides an output of the analysis of the data analysis module 312. In one case, the analysis output module 314 provides a graphical output which pictorially communicates the control nexuses within the data processing environment 304. The next subsection explores this aspect of the VAS 302 in greater detail. The analysis output module 314 can alternatively, or in addition, present its output in tabular form (e.g., in spreadsheet form), in audible form (e.g., as a spoken alert message), or in another form or combination of forms.

Finally, the VAS 302 also includes an optional mitigation module 316. One purpose of the mitigation module 316 is to provide recommendations that allow a user to reduce or eliminate vulnerabilities identified by the data analysis module 312. For example, the mitigation module 316 may suggest that the user modify the administrative structure within the data processing environment 304, such as by creating separate zones of activity, changing administrative privileges, and so forth. Or the mitigation module 316 may suggest that the user institute a change in user behavior within the environment 304 (e.g., by requiring that administrators perform their administrative tasks without creating a TGT, etc.). The mitigation module 316 can generate yet other kinds of recommendations.

Second, the mitigation module 316 can optionally automatically make changes in the data processing environment 304 to reduce or eliminate vulnerabilities. For example, upon identifying particularly worrisome vulnerabilities, the mitigation module 316 can automatically restrict or deactivate certain administrative privileges granted by the data processing environment 304. Alternatively, or in addition, the mitigation module 316 can automatically send out alert messages to users within the environment. Alternatively, or in addition, the mitigation module 316 can automatically send reports to a higher-order vulnerability assessment center (e.g., which may provide analysis for different organizations).

In one case, the user can exercise some control over the above-described automated operations by approving these operations before they are performed. In other cases, the mitigation module 316 can automatically execute corrective action without any involvement with the user or without substantial involvement with the user. In one such implementation, the VAS 302 can examine the data processing environment on a periodic basis or in response to some other type of triggering event. If the VAS 302 detects the presence of significant vulnerabilities, it can automatically take preventative actions.

Considered as a whole, one primary purpose of the VAS 302 is to detect vulnerabilities caused by the hijacking of legitimate access channels within the data processing environment 304. As noted above, these vulnerabilities do not necessarily reflect that the code used by the data processing environment 304 is deficient per se. This makes the VAS 302 a more appropriate security tool than some traditional code-based approaches to security threats. Moreover, if a weakness in code has contributed to the vulnerability, then by virtue of achieving better isolation within a data processing environment, the VAS 302 can also help reduce the spread of code-type attacks within a data processing environment.

In another implementation, the analysis performed by the VAS 302 can be combined with code-based vulnerability assessment techniques. Doing so can allow a user to provide enhanced tools to analyze and address the spread of malicious code or other malicious activity within the data processing environment. For example, the code-based vulnerability assessment techniques can identify how a user might initially crack into the data processing environment 304 to steal credentials. The VAS 302 can then identify how the user can thereafter use legitimate channels to expand their unauthorized sphere of control within the data processing environment 304.

In summary, the VAS 302 can detect vulnerabilities by focusing on the credentials which have actually appeared in a data processing environment in conjunction with administrative rights that may be used within the data processing environment. This allows the VAS 302 to assess vulnerabilities using a relatively succinct body of information, e.g., accounts, historical log-ins, group memberships, etc. This feature, in turn, confers at least two main benefits.

First, the approach taken by the VAS 302 is highly scalable. For instance, the approach taken the VAS 302 does not require detailed and idiosyncratic knowledge about the characteristics of the machines which populate a data processing environment. This allows the VAS 302 to be applied to data processing environments that have relatively large numbers of machines with relative ease. In other words, the VAS 302 can be expanded to additional machines without requiring burdensome setup and maintenance tasks and without significantly increasing the analysis load placed on the VAS 302.

Second, the approach taken by the VAS 302 is highly usable. For instance, the VAS 302 frames its analysis in terms of a discrete set of actionable and well-understood features of a data processing environment (e.g., as stated above, in terms of accounts, historical log-ins, group memberships, etc.). This means that the VAS 302 can articulate its analysis and proposed solutions to the users in a transparent and easy-to-understand manner, e.g., without introducing an overlay of "new" security-related abstractions. This also means that the VAS 302 empowers the users to control vulnerabilities using already well-understood management tools and concepts, e.g., without resorting to specialized "fixes" that require special training and maintenance.

Figure 4:
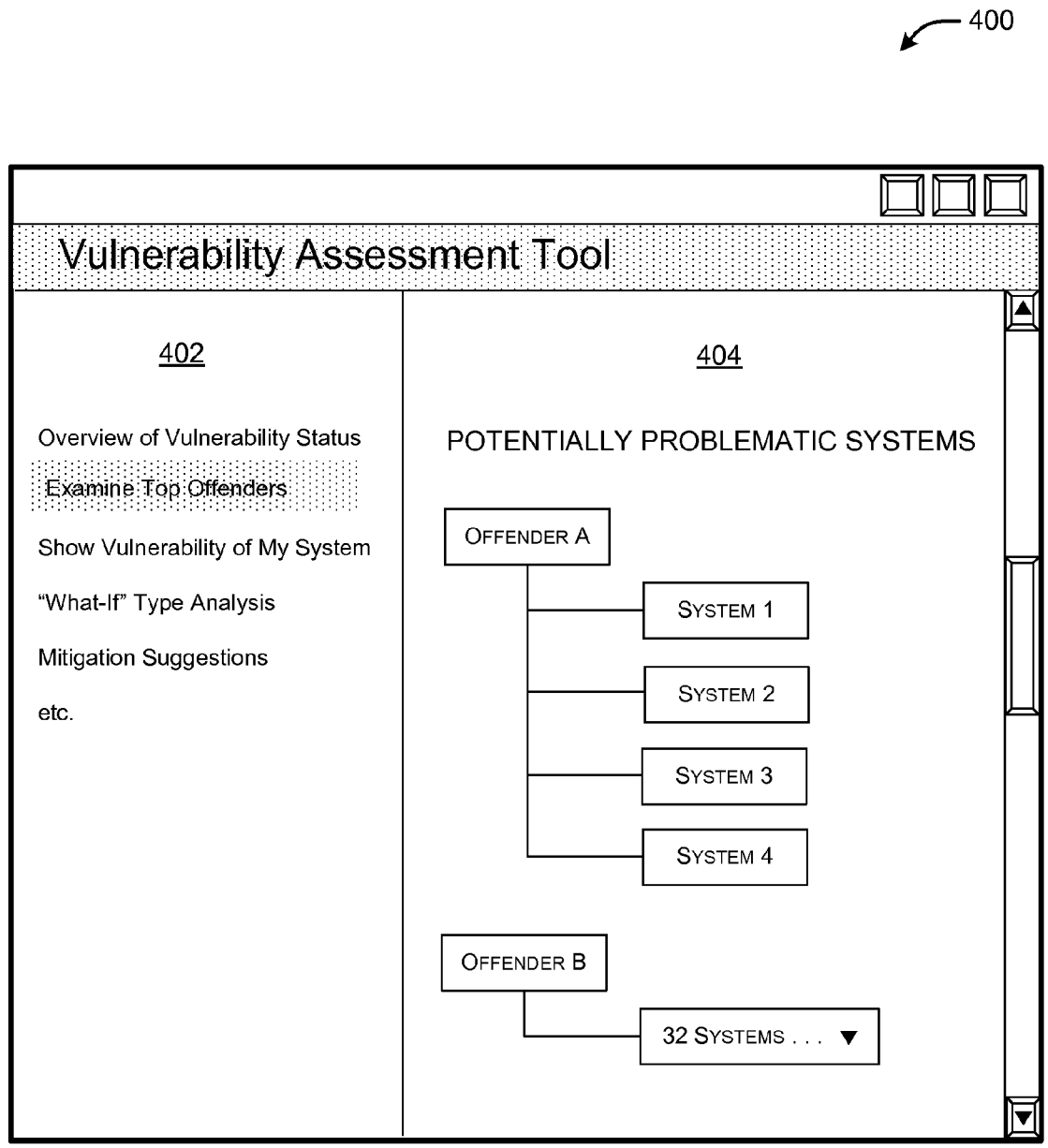
FIG. 4 shows an exemplary output display produced by the vulnerability analysis system of FIG. 3.

FIG. 4 shows one exemplary graphical user interface presentation 400 that can be produced by the VAS 302. This graphical user interface presentation 400 acts as a control interface that allows a user to initiate desired vulnerability analysis and to receive the results of such analysis. (The VAS 302 can generally produce graphical output presentations using many different presentation techniques, styles, etc. Accordingly, the graphical user interface presentation 400 shown in FIG. 4 is to be understood as strictly representative, rather than limiting.)

The representative graphical user interface presentation 400 shown in FIG. 4 includes a first section 402 that can display different analysis options. The graphical user interface presentation 400 can alternatively present these options in a drop-down menu or any other style of presentation. The particular options presented in the first section 402 are representative, non-exhaustive, and non-limiting. A first option can be activated to instruct the VAS 302 to provide an overall assessment of the security status within the data processing environment 304. A second option can be activated to instruct the VAS 302 to provide information regarding particularly problematic parts of the data processing environment 304. That is, upon invoking this option, the VAS 302 can provide analysis regarding the top n offenders identified by the VAS 302. A third option can be activated to instruct the VAS 302 to provide information regarding specific user-selected parts of the data processing environment 304. Upon invoking this option, the VAS 302 conveys information regarding the consequences of certain hypothetical events that may impact (or may be impacted by) certain identified parts of the environment 304. A fourth option can be activated to instruct the VAS 302 to perform various types of what-if analyses (as described above). A fifth option can be activated to instruct the VAS 302 to provide suggestions regarding how to reduce the vulnerabilities in the data processing environment 304. These options are exemplary rather than limiting; additional types of options can be presented to the user in the first section 402.

A second section 404 of the graphical user interface presentation 400 can provide the output of the VAS 302's analysis. In this specific scenario, the user has asked the VAS 302 to identify the top n offenders within the data processing environment 304. In response, the second section 404 provides a graphical depiction of the most problematic parts of the data processing environment 304. More specifically, the section 404 conveys these results in tree-like form, identifying each offender (e.g., entity A and entity B), as well as the systems that may be affected by the offending entities. For example, this type of display conveys that, by stealing the credentials of a particular entity A, an unauthorized user can then compromise systems 1, 2, 3, and 4. The VAS 302 can convey lengthy lists of affected systems in condensed form. For example, offender B potentially impacts 32 systems. The VAS 302 can display a single box that represents these 32 systems in collapsed form. The user can click on this box to receive a list that enumerates all of the 32 systems in non-collapsed form.

The graphical tree shown in section 404 includes two layers, namely the offending entity as a first layer, and the affected systems as a second layer. In an alternative case, the VAS 302 can convey the control relationships using additional layers. For example, the VAS 302 can add another layer to demonstrate how the compromise of system 1 may lead to the compromise of additional machines. Still higher-order effects can be communicated in a like manner by adding additional layers to the tree.

The graphical tree shown in section 404 is presented in top-down list format. In an alternative case, the VAS 302 can convey the control relationships in other formats, including a star form. In this form, the offending entity is placed in the center of the star, with radial arms terminating in potentially affected systems.

In still other cases, the VAS 302 can alternatively, or in addition, convey vulnerabilities in non-graphical form, such as in spreadsheet form, audible form, and so on.

A.3. Exemplary Processing Functionality

Figure 5:
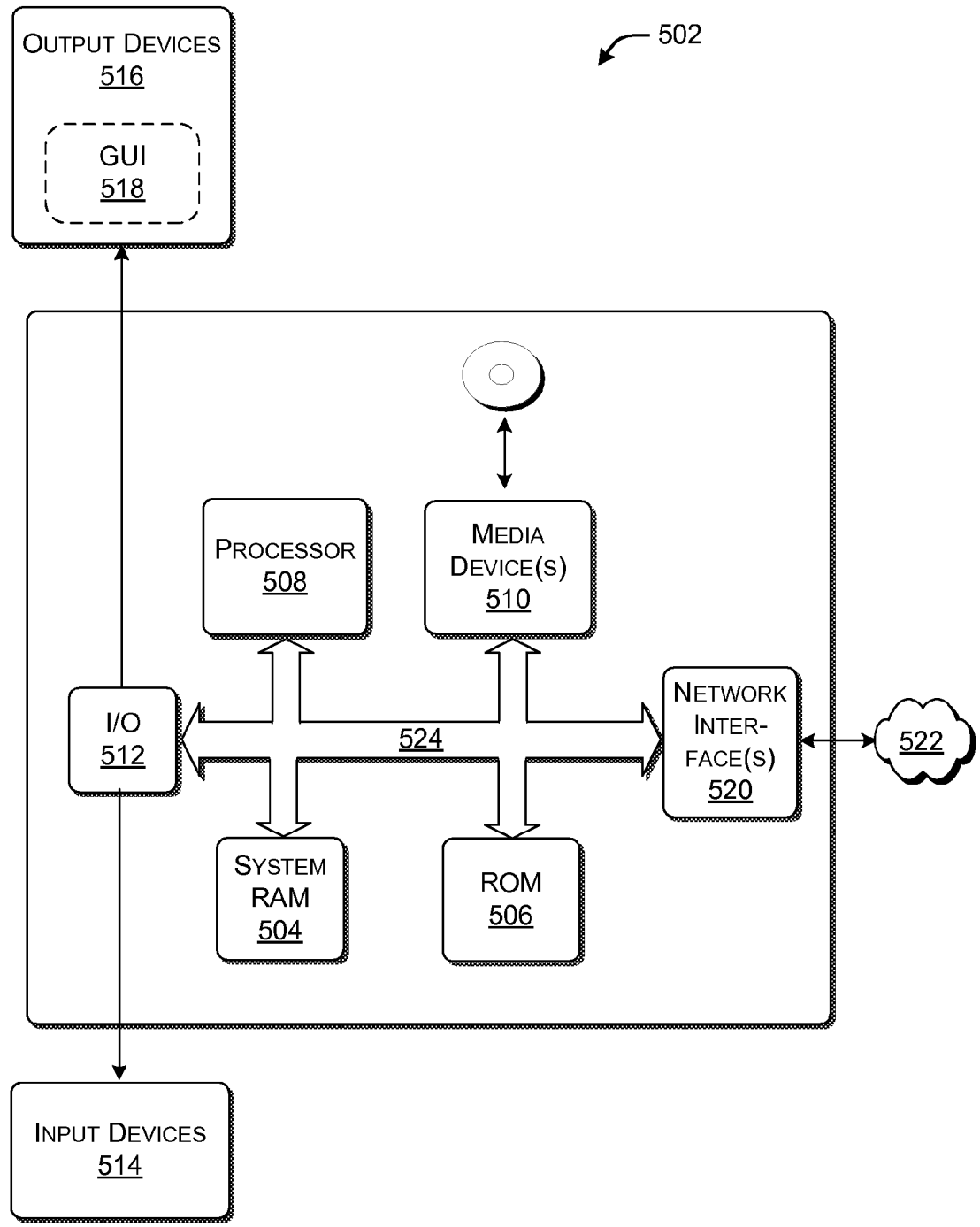
FIG. 5 shows exemplary processing functionality for implementing any aspect of the system of FIG. 3.

Various aspects of the components shown in FIG. 3 can be implemented by information processing equipment, including any combination of software, firmware, and hardware. FIG. 5 sets forth exemplary processing functionality 502 that can be used to implement any aspect of these components. For example, in the cases where the VAS 302 can be implemented by a computer machine, the data processing functionality 502 can be used to implement this computer machine. The processing functionality 502 can also generally represent any component within the data processing environment 304, such as a user computer, a server computer, and so forth.

The processing functionality 502 can include various volatile and non-volatile memory, such as RAM 504 and ROM 506, as well as one or more central processing units (CPUs) 508. The processing functionality 502 can perform various operations identified above when the CPU 508 executes instructions that are maintained by memory (e.g., 504, 506, or elsewhere). The processing functionality 502 also optionally includes various media devices 510, such as a hard disk module, an optical disk module, and so forth.

The processing functionality 502 also includes an input/output module 512 for receiving various inputs from the user (via input devices 514), and for providing various outputs to the user (via output devices 516). One particular output device may include a display apparatus and an associated graphical user interface (GUI) 518. The processing functionality 502 can also include one or more network interfaces 520 for exchanging data with other devices via one or more communication conduits 522. One or more communication buses 524 communicatively couple the above-described components together.

The communication conduits 522 can be implemented in different ways to suit different technical and commercial environments. For instance, the communication conduits 522 can include any kind of network (or combination of networks), such as a wide area network (e.g., the Internet), an intranet, Digital Subscriber Line (DSL) network infrastructure, point-to-point coupling infrastructure, and so on. In the case where one or more digital networks are used to exchange information, the communication conduits 522 can include various hardwired and/or wireless links, routers, gateways, name servers, and so on.

B. Exemplary Procedure

Figure 6:
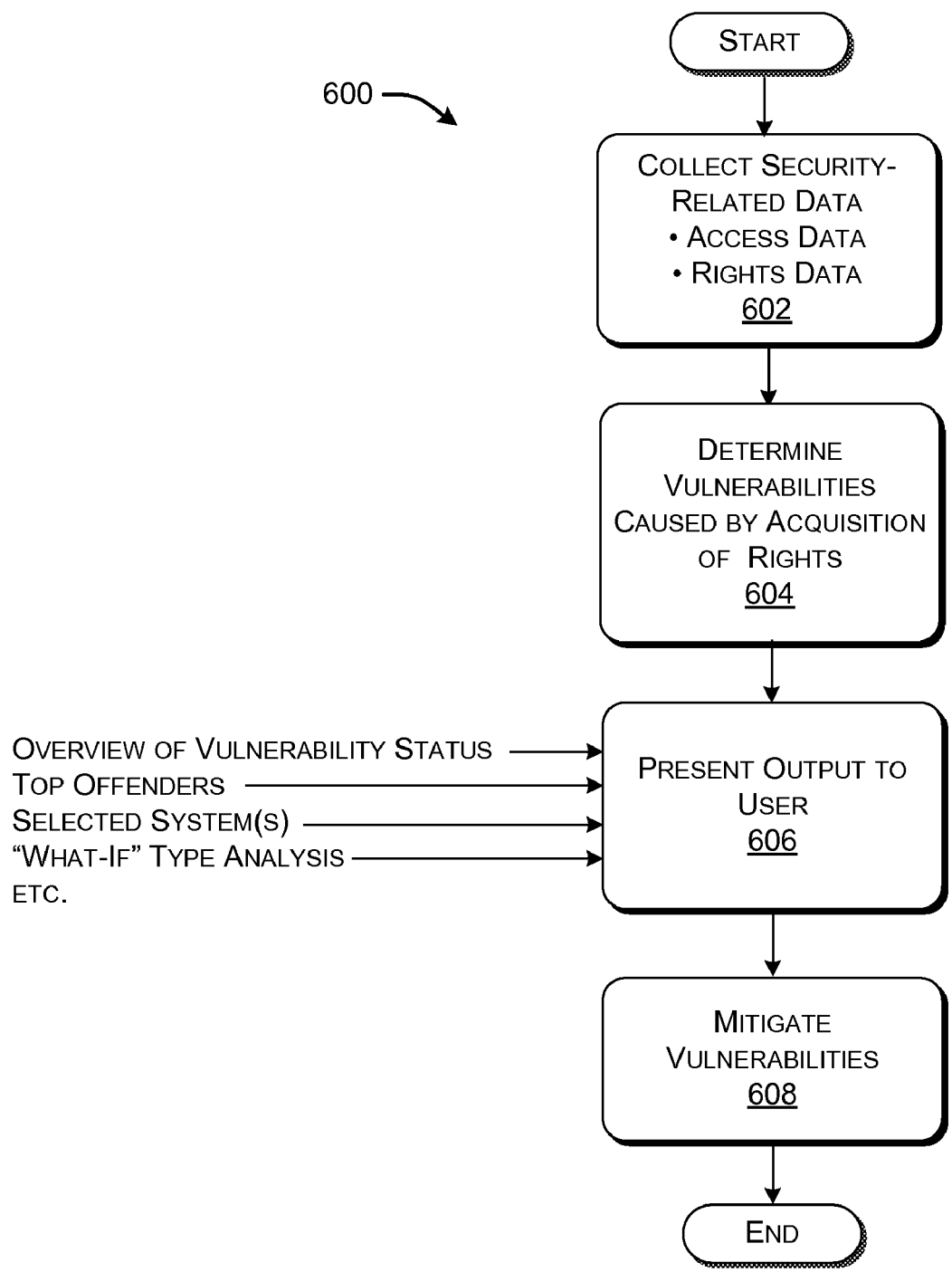
FIG. 6 shows an exemplary procedure for identifying and mitigating vulnerabilities within a data processing environment.

FIG. 6 shows a procedure 600 which explains the operation of the VAS 302 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowchart have already been set forth in Section A, Section B serves principally as a review of those functions.

In operation 602, the VAS 302 collects security data for use in assessing the vulnerabilities of the data processing environment 304. As described, the security data may include access data and rights data. The access data reflects the actual log-in behavior of users in the data processing environment 304. The rights data reflects the structure of administrative rights within the data processing environment 304.

In operation 604, the VAS 302 determines, based on the security data collected in operation 602, the paths of rights-related compromise within the data processing environment 304. Operation 604 can use a graph search algorithm to perform its analysis, such as the breadth-first search algorithm.

In operation 606, the VAS 302 provides the output of its analysis to the user. As described above, the VAS 302 can use different techniques to convey its results, including various types of pictorial presentations, tabular presentations, and so on.

In operation 608, the VAS 302 can potentially mitigate the vulnerabilities assessed in the previous operation (606). Mitigation can take the form of providing recommendations to the user. The recommendations identify ways to reduce vulnerabilities. In addition, or alternatively, mitigation can be implemented by automatically taking corrective action that affects the data processing environment.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a computer machine for scalably investigating a security status of a data processing environment, the data processing environment including a collection of components, the method comprising:
    receiving access data that reflects historical access to at least one component in the data processing environment by at least one accessing entity;
    receiving rights data that reflects rights possessed by at least one access-entitled entity, the rights entitling the at least one access-entitled entity to perform acts including:
        accessing plural components of the collection of components within the data processing environment; and
        conferring a subset of the rights to one or more accessing entities;
    investigating, via the computer machine, the security status of the data processing environment based on the access data and the rights data;
    identifying, based on the investigating:
        an extent to which obtained rights to one or more components of a first part of the data processing environment can be used to compromise one or more components of a second part of the data processing environment based at least in part on the accessing and the conferring; and
        the one or more components of the second part of the data processing environment; and
    providing an output which reflects an outcome of the identifying.

2. The method of claim 1, wherein the collection of components comprises a collection of computers within an organization.

3. The method of claim 1, wherein the access data reflects log-in behavior exhibited by said at least one accessing entity.

4. The method of claim 1, wherein said at least one access-entitled entity is an administrator within the data processing environment, and wherein the rights data entitles the administrator to log into the plural components within the data processing environment.

5. The method of claim 1, wherein the security status revealed by the investigating identifies an extent to which obtaining rights to the first part of the data processing environment can be expanded to compromise the second part of the data processing environment through a nexus of access rights shared by plural access-entitled entities.

6. The method of claim 1, wherein the investigating comprises identifying at least one component of interest within the data processing environment, and wherein the security status revealed by the investigating focuses on an assessed vulnerability associated with said at least one component of interest.

7. The method of claim 1, wherein the outputting comprises providing a graphical depiction which portrays the outcome of the identifying, the graphical depiction including all components the rights data of each of the at least one access-entitled entity allows access to.

8. The method of claim 7, wherein the graphical depiction shows a graphical nexus between the first part of the data processing environment and the second part of the data processing environment.

9. The method of claim 1, further comprising mitigating at least one vulnerability revealed by the investigating.

10. The method of claim 9, wherein the mitigating comprises providing a recommendation that enables a user to reduce said at least one vulnerability.

11. The method of claim 9, wherein the mitigating comprises automatically affecting corrective action within the data processing environment to reduce said at least one vulnerability.

12. One or more machine-readable storage device containing machine-readable instructions for implementing the method of claim 1.

13. A method for scalably investigating a security status of a data processing environment, the data processing environment including a collection of computers within an organization, the method comprising:
    receiving security-related data that indicates access security of computers within the data processing environment, the security-related data including an historical component that reflects prior access to the data processing environment and rights data that reflects corresponding rights possessed by each of multiple administrators within the organization, the corresponding rights enabling each of the multiple administrators to access an associated subset of the collection of computers;
    investigating, by a computer-implemented vulnerability analysis system, the security status of the data processing environment based on the security-related data, the security status identifying an extent to which obtaining corresponding rights of at least one of the multiple administrators access to at least one computer in the data processing environment can be expanded to obtain corresponding rights of other of the multiple administrators and compromise one or more other computers in the data processing environment; and
    providing, by the computer-implemented vulnerability analysis system, an output which reflects an outcome of the investigating, the output including the one or more other computers in the data processing environment.

14. The method of claim 13, wherein the historical component includes access data that reflects historical log-in behavior within the data processing environment.

15. The method of claim 14, wherein the investigating can resolve the security status of the data processing environment based on the access data and the rights data alone.

16. One or more machine-readable storage devices containing machine-readable instructions for implementing the method of claim 13.

17. A vulnerability analysis system for investigating a security status of a large data processing environment, the data processing environment including a collection of components, the system comprising:
- one or more processors;
- a data collection module operative to receive data, the data including:
  - access data that reflects historical access to at least one component in the data processing environment by at least one accessing entity; and
  - rights data that reflects rights possessed by each of multiple access-entitled entities, the rights entitling at least one of the multiple access-entitled entities to:
    - access plural components in the data processing environment that are within a sphere of influence of the at least one of the multiple access-entitled entities; and
    - confer a subset of the rights to an accessing entity to access one or more of the plural components that are within a sphere of influence of another of the multiple access-entitled entities;
- a data analysis module, executing on at least one of the one or more processors, the data analysis module operative to:
  - investigate the security status of the data processing environment based on the access data and the rights data;
  - use the security status to identify an extent to which obtained rights to the one or more components that are within the sphere of influence of the other of the multiple access-entitled entities can be used to compromise one or more components in an other part of the data processing environment; and
  - identify the one or more components in the other part of the data processing environment;
- an analysis output module operative to generate output which reflects an outcome of the investigating.

18. The vulnerability analysis system of claim 17, wherein the access data reflects log-in behavior exhibited by said at least one accessing entity.

19. The vulnerability analysis system of claim 17, wherein at least one of the multiple access-entitled entities is an administrator within the data processing environment, and wherein the rights data entitles the administrator to log into the plural components within the data processing environment.

20. The vulnerability analysis system of claim 17, wherein the analysis output module is operative to provide a graphical depiction which portrays:
- the outcome of the investigating and the one or more components in the other part of the data processing environment;
- top offenders in the data processing environment;
- consequences of an impact of hypothetical events on one or more parts of the data processing environment; and
- suggestions to reduce vulnerabilities in the data processing environment.

* * * * *